(12) United States Patent
Solomon et al.

(10) Patent No.: US 11,483,133 B2
(45) Date of Patent: Oct. 25, 2022

(54) SECURE CONTENT ROUTING USING ONE-TIME PADS

(71) Applicant: DEFENDER CYBER TECHNOLOGIES LTD., Herzlia (IL)

(72) Inventors: Maria Solomon, Barqan (IL); Doron Solomon, Barqan (IL)

(73) Assignee: DEFENDER CYBER TECHNOLOGIES LTD., Herzlia (IL)

( * ) Notice: Subject to any disclaimer, the term of this patent is extended or adjusted under 35 U.S.C. 154(b) by 168 days.

(21) Appl. No.: 16/769,839

(22) PCT Filed: Dec. 4, 2018

(86) PCT No.: PCT/IL2018/051331
§ 371 (c)(1),
(2) Date: Jun. 4, 2020

(87) PCT Pub. No.: WO2019/111254
PCT Pub. Date: Jun. 13, 2019

(65) Prior Publication Data
US 2020/0382288 A1    Dec. 3, 2020

Related U.S. Application Data

(60) Provisional application No. 62/594,550, filed on Dec. 5, 2017.

(51) Int. Cl.
*H04L 9/06*    (2006.01)
*H04L 9/08*    (2006.01)
*H04L 9/32*    (2006.01)

(52) U.S. Cl.
CPC .......... *H04L 9/0662* (2013.01); *H04L 9/0852* (2013.01); *H04L 9/3228* (2013.01)

(58) Field of Classification Search
CPC ... H04L 9/0662; H04L 9/0852; H04L 9/3228; H04L 63/0428; H04L 63/04;
(Continued)

(56) References Cited

U.S. PATENT DOCUMENTS 5,805,706 A    9/1998 Davis
8,160,243 B1    4/2012 Bean
(Continued)

FOREIGN PATENT DOCUMENTS

WO    1997039552 A1    10/1997
WO    2014182816 A2    11/2014
WO    2017168201 A2    10/2017

OTHER PUBLICATIONS

International Search Report of PCT/IL2018/051331 Completed Mar. 7, 2020; dated Mar. 19, 2020 5 pages.
(Continued)

*Primary Examiner* — Abu S Sholeman
(74) *Attorney, Agent, or Firm* — The Roy Gross Law Firm, LLC; Roy Gross

(57) ABSTRACT

A method comprising receiving, by a one-time pad (OTP) hub, from a first user of a computer network, a communication encrypted with an OTP associated with said first user, wherein said communication is intended for a second user; encrypting, by said hub, said communication with an OTP associated with said second user; decrypting, by said hub, said communication with an OTP associated with said first user; and delivering said communication to said second user.

17 Claims, 6 Drawing Sheets

(58) Field of Classification Search
CPC ............... H04L 9/3236; H04L 63/0464; H04L 63/0471; H04L 63/067; H04L 63/0838; H04L 9/0656; G06F 21/85; G06F 2221/2107; G06F 21/606
See application file for complete search history.

(56) References Cited

U.S. PATENT DOCUMENTS

| | | | | |
|---|---|---|---|---|
| 8,250,363 | B2* | 8/2012 | Tofts | H04L 9/0852 |
| | | | | 713/162 |
| 8,745,379 | B2* | 6/2014 | Orsini | H04L 9/085 |
| | | | | 713/157 |
| 9,590,951 | B2* | 3/2017 | Tomkow | H04L 9/0656 |
| 10,313,332 | B2* | 6/2019 | Hong | H04W 12/068 |
| 2002/0164026 | A1 | 11/2002 | Huima | |
| 2004/0034772 | A1* | 2/2004 | Alao | H04L 9/302 |
| | | | | 713/168 |
| 2006/0059343 | A1* | 3/2006 | Berzanskis | H04L 7/0075 |
| | | | | 713/171 |
| 2007/0208949 | A1* | 9/2007 | Lu | G06F 21/34 |
| | | | | 713/186 |
| 2009/0327703 | A1 | 12/2009 | Feudo et al. | |
| 2010/0082478 | A1 | 4/2010 | Van Der Veen et al. | |
| 2011/0022807 | A1* | 1/2011 | Maeda | G06F 3/0643 |
| | | | | 711/154 |
| 2012/0084200 | A1* | 4/2012 | Triana | G06Q 20/385 |
| | | | | 705/39 |
| 2014/0337615 | A1* | 11/2014 | Tomkow | H04L 63/0428 |
| | | | | 713/153 |
| 2015/0229621 | A1 | 8/2015 | Kariman et al. | |
| 2017/0033925 | A1* | 2/2017 | DeNeut | H04L 9/0819 |
| 2017/0180117 | A1* | 6/2017 | Tomkow | H04L 63/0428 |
| 2018/0063096 | A1 | 3/2018 | Rogson | |

OTHER PUBLICATIONS

Written Opinion of PCT/IL2018/051331 Completed Mar. 7, 2020; dated Mar. 19, 2020 8 pages.
International Search Report of PCT/IL2020/050030 Completed Mar. 19, 2020; dated Mar. 19, 2020 4 pages.
European Search Report for EP 18887104.0 dated Jul. 7, 2021 7 pages.
J. L. Duligall et al., "Low cost and compact quantum key distribution", New Journal of Physics, vol. 8 Issue 10, Oct. 1, 2006.

* cited by examiner

SECURE CONTENT ROUTING USING ONE-TIME PADS

CROSS-REFERENCE TO RELATED APPLICATIONS

This application is a National Phase of PCT Patent Application No. PCT/IL2018/051331 having International Filing date of Dec. 4, 2018, which claims the benefit of priority under 35 U.S.C. § 119(e) of U.S. Provisional Patent Application No. 62/594,550, filed Dec. 5, 2017, entitled "Methods and Systems for Implementing A Perfect Security Network Using One-Time Pads". The contents of the above applications are all incorporated by reference as if fully set forth herein in their entirety.

BACKGROUND

The invention relates to the field of data encryption.

In cryptography, the one-time pad (OTP) is an encryption technique that is unbreakable but requires the use of a one-time pre-shared key the same size as, or longer than, the message being sent. In this technique, a plaintext is paired with a random secret key (also referred to as a one-time pad). Then, each bit or character of the plaintext is encrypted by combining it with the corresponding bit or character from the pad using one of several functions.

If the key is truly random, never reused in whole or part, and kept secret, it is demonstrably mathematically impossible to decipher the ciphertext without a copy of the pad. Because OTP encryption adds no information to the enciphered text, only random noise, it represents a perfect, unbreakable encryption method.

However, one-time pad cryptography faces several implementation difficulties. First, the secure generation, exchange, and disposal of the OTP material, which must be at least as long as the message, is difficult to achieve. In addition, the possibility of interception, copying, or forensic recovery of a pad by a third party will entirely compromise the security of the method.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising receiving, by a one-time pad (OTP) hub, from a first user of a computer network, a communication encrypted with an OTP associated with said first user, wherein said communication is intended for a second user; encrypting, by said hub, said communication with an OTP associated with said second user; decrypting, by said hub, said communication with an OTP associated with said first user; and delivering said communication to said second user.

There is also provided, in an embodiment, a system comprising at least one hardware processor; and a non-transitory computer-readable storage medium having program code embodied therewith, the program code executable by said at least one hardware processor to perform said method.

There is further provided, in an embodiment, a computer program product comprising a non-transitory computer-readable storage medium having program code embodied therewith, the program code executable by at least one hardware processor to perform the method said method.

In some embodiments, said second user further decrypts said communication with an OTP associated with said second user.

In some embodiments, said network comprises a plurality of users, wherein each of said users stores only an OTP associated with said user.

In some embodiments, said hub stores OTPs associated with each of said plurality of users.

There is provided, in an embodiment, a method comprising receiving, by a first one-time pad (OTP) hub in a series of hubs, from a first user of a computer network, a communication encrypted with an OTP associated with said first user, wherein said communication is intended for a second user; encrypting, by said first hub, said communication with a first inter-hub OTP, decrypting, by said first hub, said communication with an OTP associated with said first user; forwarding said communication through one or more hubs in said series, wherein each said forwarding between a pair of said hubs comprises: (i) encrypting said communication with an inter-hub OTP associated with said pair, and (ii) decrypting said communication with an inter-hub OTP associated with a previous said pair; encrypting, by a last of said series of hubs, said communication with an OTP associated with said second user; decrypting, by said last of said series of hubs, said communication with said inter-hub OTP associated with said previous pair; and transmitting said communication to said second user.

There is also provided, in an embodiment, a system comprising at least one hardware processor; and a non-transitory computer-readable storage medium having program code embodied therewith, the program code executable by said at least one hardware processor to perform said method.

There is further provided, in an embodiment, a computer program product comprising a non-transitory computer-readable storage medium having program code embodied therewith, the program code executable by at least one hardware processor to perform the method said method.

In some embodiments, said second user further decrypts said communication with an OTP associated with said second user.

In some embodiments, said network comprises N said users and a plurality of said hubs.

In some embodiments, each of said users stores only an OTP associated with said user.

In some embodiments, each of said hubs stores OTPs associated with between 1 and all of said users.

In some embodiments, at least some of said users and said hubs store a routing table identifying said associations between said OTPs stored by each of said hubs and their associated users.

In some embodiments, at least some of said receiving, said forwarding, and said transmitting are based, at least in part, on said routing table.

In some embodiments, said routing table takes into account an OTP usage metric.

In some embodiments, said network comprises two or more networks.

There is provided, in an embodiment, a method comprising: receiving, by a first one-time pad (OTP) hub, from a first user of a computer network, a communication encrypted with an OTP associated with said first user, wherein said communication is intended for a second user; encrypting, by said first hub, said communication with an OTP associated with said second user; transmitting, by said first hub, said communication to a second hub; decrypting, by said second hub, said communication with an OTP associated with said first user; and transmitting said communication to said second user.

There is also provided, in an embodiment, a system comprising at least one hardware processor; and a non-transitory computer-readable storage medium having program code embodied therewith, the program code executable by said at least one hardware processor to perform said method.

There is further provided, in an embodiment, a computer program product comprising a non-transitory computer-readable storage medium having program code embodied therewith, the program code executable by at least one hardware processor to perform the method said method.

In some embodiments, said second user further decrypts said communication with an OTP associated with said second user.

In some embodiments, said network comprises N said users and a plurality of said hubs.

In some embodiments, each of said hubs stores OTPs associated with between 1 and all of said users.

In some embodiments, at least some of said users and said hubs store a routing table identifying said associations between said OTPs stored by each of said hubs and their associated said users.

In some embodiments, at least some of said receiving and said transmitting are based, at least in part, on said routing table.

In some embodiments, said routing table takes into account an OTP usage metric.

In some embodiments, each of said users stores a second OTP associated with said user, and wherein said second OTP is configured for use in connection with a two-step user authentication of said user.

In some embodiments, said second OTP is configured for use in connection with a two-step user authentication of said user.

In some embodiments, the method further comprises, and in the case of said system and said computer program product, said instructions are further executable to provide for, user authentication based, at least in part, on universal hashing.

In some embodiments, OTPs of the present invention are disposed by overwriting at least a portion thereof using false data.

In some embodiments, at least some of said hubs further comprise at least one of a random numbers generator (RNG), and an automated teller machine configured for dispensing OTPs to said users.

In some embodiments, said OTPs are distributed to the automated teller machine using at least one of Quantum Key distribution (QKD) communication, and physically secured distribution means.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
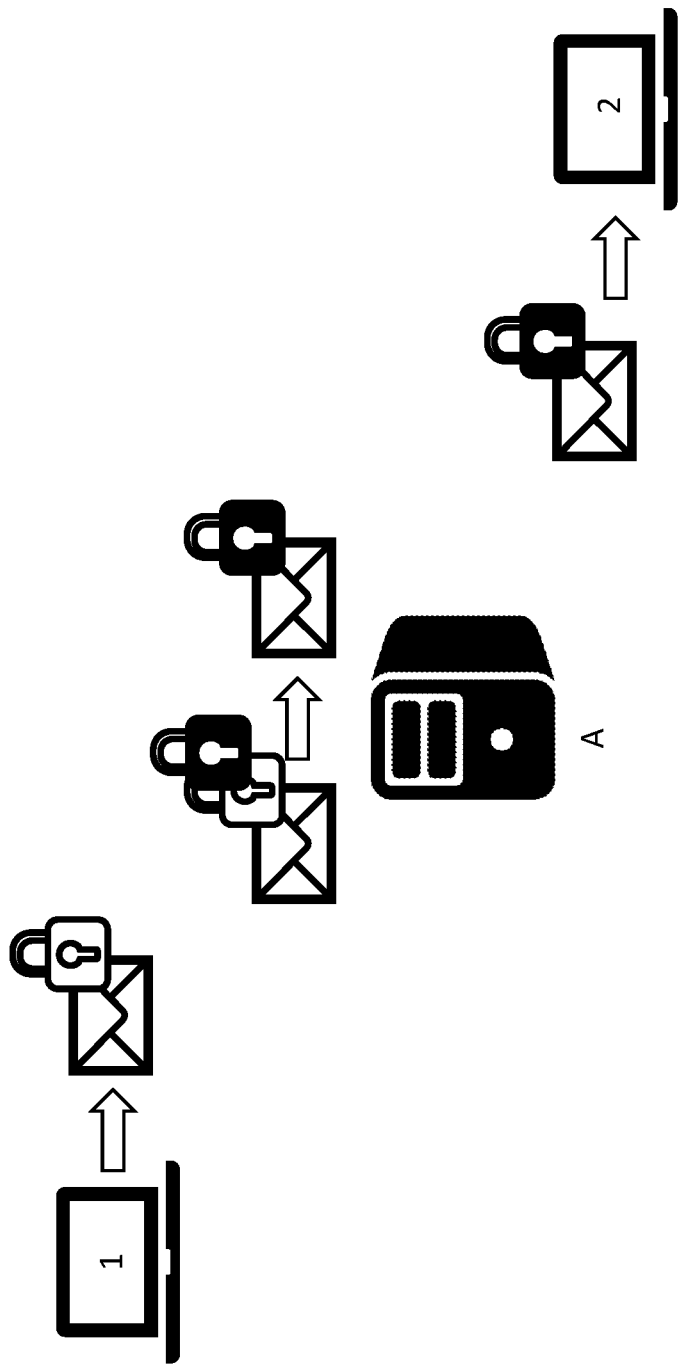
FIG. 1A illustrates an exemplary centralized OTP encryption scheme according to an embodiment.

Disclosed herein are a system, method, and computer program product for secure routing of messages between two or more users, using one-time pad (OTP) cryptography.

As noted above, OTP cryptography typically faces significant practical difficulties. First, in order to provide absolute cryptographic stability, OTPs must have truly random encryption key, be equal in size with a message to be encrypted, never reused, and disposed of properly immediately after use. Current random number generators can produce random key material of sufficient quality for use in OTP cryptography. In addition, as a practical matter, modern computer systems can store and handle the requisite amounts of random key data.

However, the security of an OTP-based cryptography system continues to depend on secure pad handling and distribution, because interception and copying of a pad by a third party will compromise the security of the method. This problem is further compounded with any increase in the number of communicants in a network, because each sender/recipient pair must maintain a unique pad shared only between the two of them. As the number of network users increases, the number of unique pads needed increases by power of two, so that at a certain point, the number of pads needed to be retained by each network constituent becomes unmanageable.

Accordingly, in some embodiments, the present invention provides for a centralized OTP encryption scheme wherein an OTP hub is responsible for routing encrypted messages among a plurality of network users. In some embodiments, an OTP encryption scheme of the present invention comprises encrypting each bit or character of the plaintext by combining it with a corresponding bit or character from a pad, using: modular addition, any table exchange group that is an injective or one-to-one transformation function, and/or any other homomorphic function or homomorphic encryption function.

In some exemplary embodiments, the OTP encryption scheme described herein can be utilized to enable OTP-encrypted communication between multiple sender/receiver end users, for enabling OTP encrypted video/audio conferencing, email exchange, file exchange, multi-party digitized telephone voice communications, gaming, etc. In other exemplary embodiments, the OTP encryption scheme described herein can be used to exchange messages utilizing push and pull network communication technologies, including but not limited to unicasting, multicasting, and broadcasting messages, such as SMS, Instant Messages, and the like. In yet other exemplary embodiments, such communication may be enabled via wired and wireless networks and via any number and any kind of gateways and proxies. In some embodiments, there could be any number of OTP hubs geographically distributed in various locations and regions. In some embodiments, any type of communication channel may be encrypted using the disclosed invention, e.g., end-to-end communication tunnels, publish/subscribe protocols-based communications, TCP/UDP-based communications, as well as non-TCP communications. The disclosed encryption scheme can also be used in addition to any other data protection technology, such as TLS/SSL and the like.

In some embodiments, an OTP hub of the present invention may be implemented in hardware only, software only, or a combination of both hardware and software. For example, the OTP hub may be a personal computer, a tablet, a smart phone, an embedded device, a hand-held device coupled with a radio module, a concealed device, a device having an electronic circuitry, and the like. In some embodiments, the OTP hub may comprise one or more hardware processors, and a non-transitory computer-readable storage device. In various embodiments, an OTP hub may comprise one or more dedicated hardware devices, one or more software modules, and/or may form an addition or extension to an existing device. In some embodiments, the one or more dedicated hardware devices may be located in different locations. The storage medium of an OTP hub may have encoded thereon software instructions or components configured to operate the one or more hardware processors. In some embodiments, the software components may include an operating system, including various software components and/or drivers for controlling and managing general system tasks (e.g., memory management, storage device control, power management, etc.), and facilitating communication between various hardware and software components. In some embodiments, the program instructions are segmented into one or more software modules, which may comprise, e.g., an encryption/decryption module, a communications module, and a user interface module.

In some embodiments, the OTP hub retains copies of all unique pads for each network end user, so as to act as an encrypting/decrypting intermediary between each pair of users, thereby eliminating the need for each user to hold a different pad for each potential recipient. In some embodiments, the centralized OTP hub comprises more than one separate hardware devices, wherein no single hardware device retains all pads necessary to decrypt any message. In some embodiments, a centralized OTP encryption scheme of the present invention may be configured for ensuring that each message remains subject to at least one layer of OTP encryption at all times.

In some embodiments, the OTP hub retains copies of all unique pads for each network end user, so as to act as an encrypting/decrypting intermediary between each pair of users, thereby eliminating the need for each user to hold a different pad for each potential recipient.

In some embodiments, by centralizing pad distribution and retention in the OTP hubs, the present invention also avoids the need to distribute multiple pads to end users, thereby potentially exposing pads to hostile misappropriation, and compromising overall system security. Thus, system-wide pads need only be distributed to a limited number of OTP hubs, which may be handled through secure electronic and/or physical distribution.

In some embodiments, the present invention provides for a network comprising a cluster of users and one or more OTP hubs, wherein the one or more OTP hubs are configured for securely routing a message between each pair of users in the network. In some embodiments, the network of the present invention provides for multiple possible encrypted messaging routes between each sender/recipient pair, to ensure redundancy in case of hub failure or malfunction.

In some embodiments, the present invention further provides for secure routing of messages among one or more clusters of users in remote networks.

In some embodiments, the present invention further provides for optimizing OTP-based message routing among a plurality of users and/or networks, based on minimizing an OTP usage metric and/or additional routing parameters.

In some embodiments, the present invention further provides for one or more of random number generation, message authentication, secure OTP keys distribution to end users, and/or secure OTP key disposal.

A potential advantage of the present invention is, therefore, in that it provides for a practical real-world OTP-based encryption scheme, which is optimized for local and/or remote multi-user environments, while ensuring secure pad handling and distribution.

FIG. 1A illustrates an exemplary centralized OTP encryption scheme according to an embodiment. An OTP hub A retains corresponding pads associated with each network user, e.g., sender 1 and recipient 2. OTP hub A receives a message from sender 1 encrypted with the sender pad. OTP hub A then encrypts the message with the recipient pad, and removes the sender pad, in each case using the corresponding pads retained by Hub A, and transmits the message to the recipient. Thus, sender 1 and recipient 2 can communicate through Hub A, without each having to retain both of their respective pads.

In some embodiments, OTP hub A may be configured for first encrypting a message with the recipient pad, and only then removing the sender pad, so as to ensure that a message is never retained in an unencrypted state by any network constituent.

As noted above, in some embodiments, an OTP hub of the present invention, such as OTP hub A, may be implemented on a server. In some embodiments, such server may comprise one or more physical devices, and/or distributed systems having more than one hardware processor and associate storage media. In some embodiments, one or more OTP hubs may be implemented on a single hardware device, and/or one or more OTP hubs may be implemented more than one separate hardware devices, wherein no single hardware device retains all pads necessary to decrypt any message.

Figure 1B:
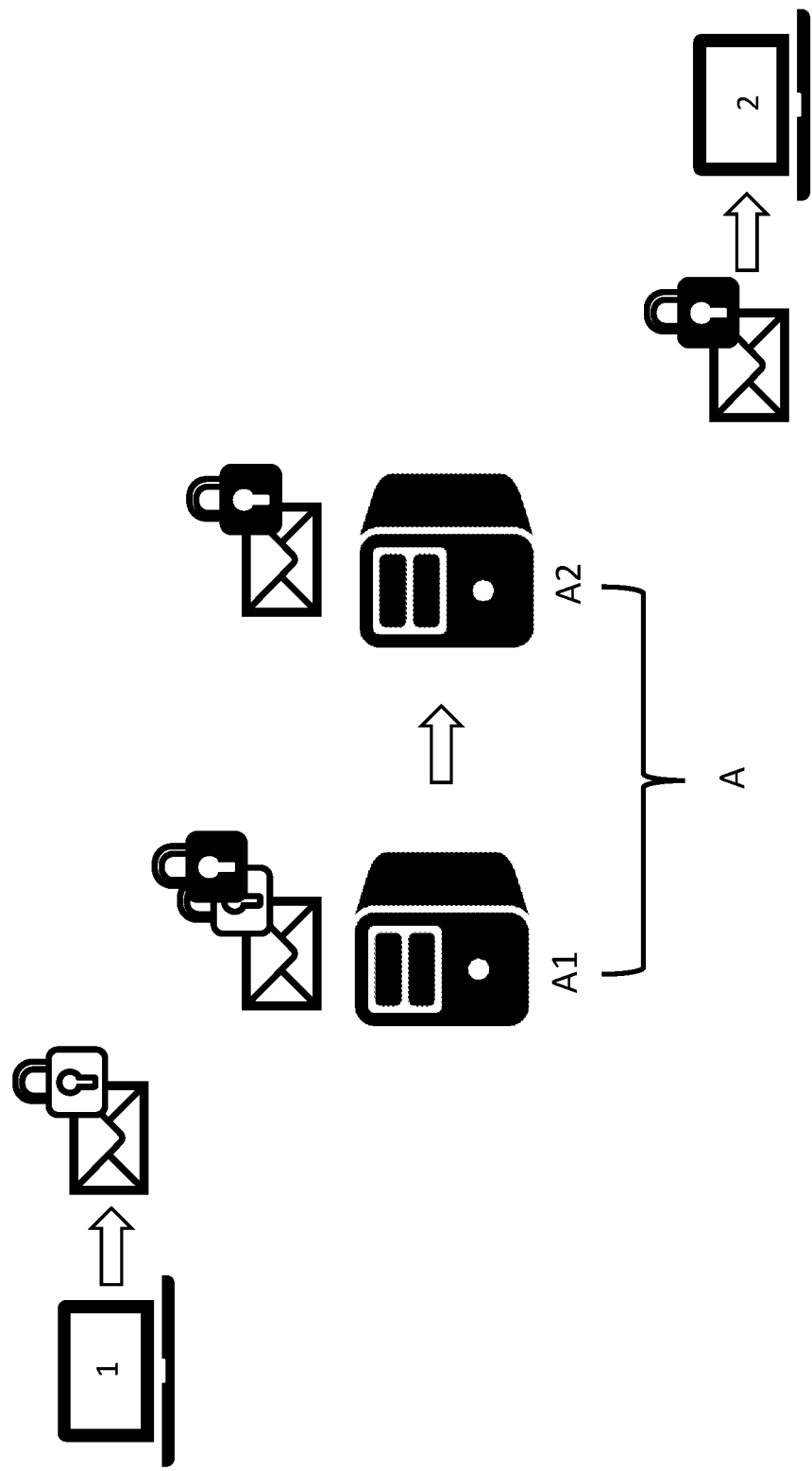
FIG. 1B illustrates an exemplary centralized OTP encryption scheme wherein an OTP hub is implemented in two or more physical devices, according to an embodiment.

FIG. 1B illustrates an exemplary centralized OTP encryption scheme wherein OTP hub A is implemented in two or more separate hardware devices, e.g., parts A1 and A2, wherein each part retains a different set of end user pads. For example, part A1 may receive a message encrypted with a sender pad, and encrypt the message with a recipient pad. The message is then transmitted to a second part A2, where the sender pad is removed and the message is transmitted to the recipient with only the recipient pad. This configuration offers increased security because no single physical device holds all pads necessary to decrypt any message. In addition, as noted above, the message itself remains encrypted at all times with at least one pad as it is forwarded through the separate hardware devices.

Figure 1C:
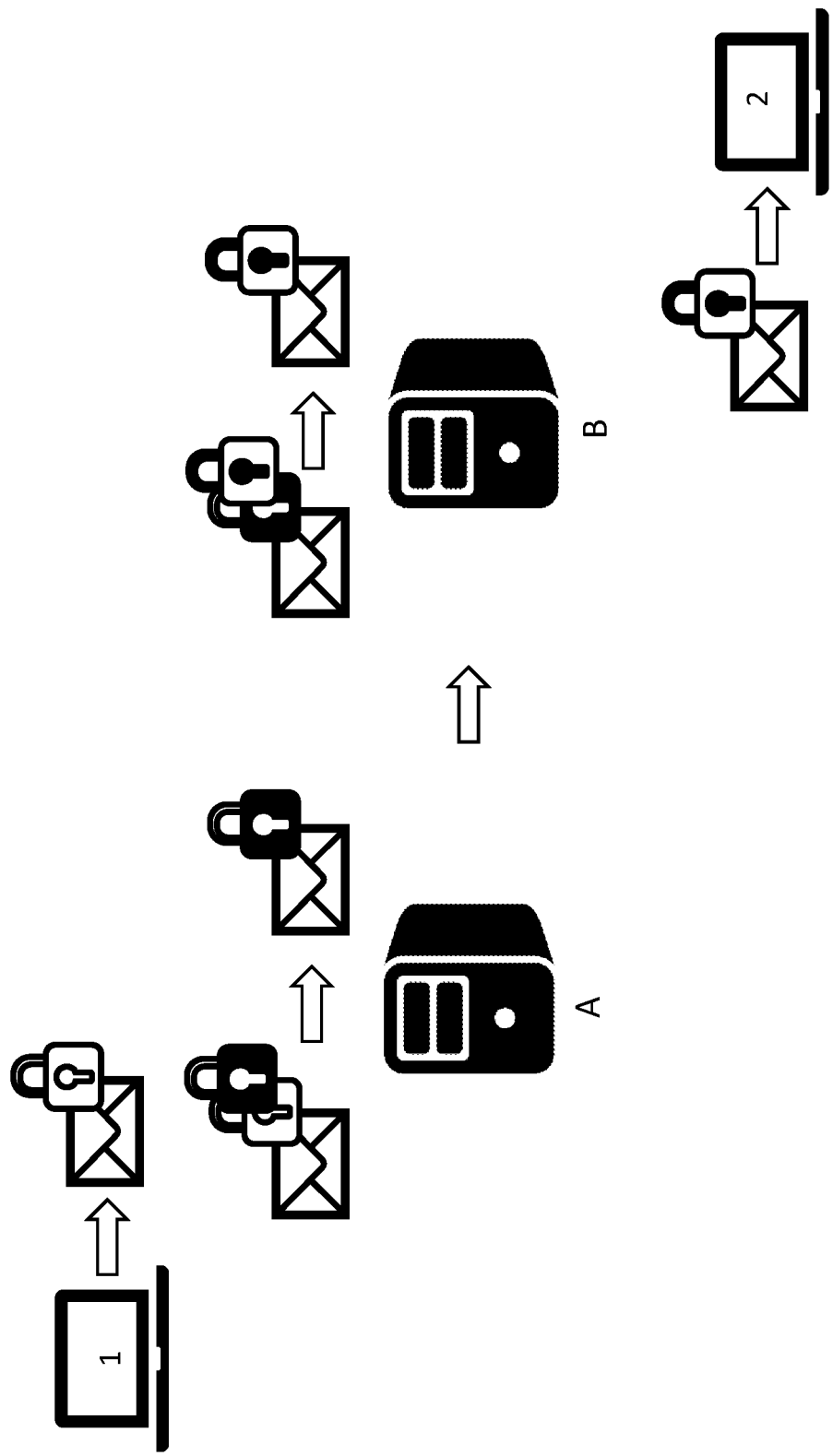
FIG. 1C illustrates an exemplary centralized OTP encryption scheme comprising two or more separate OTP hubs, according to an embodiment.

FIG. 1C illustrates an exemplary centralized OTP encryption scheme comprising two or more separate OTP hubs. In this configuration, a message may be routed through multiple hubs, e.g., hubs A and B. Each inter-hub hop involves encrypting the message with an inter-hub pad and only after that removing a previous pad. For example, the hop from hub A to hub B involves encrypting the message with an inter-hub pad unique to the A-B pair, and only after that removing the sender pad. Once the message reaches the final hub in the chain (in this case, hub B), the message is encrypted with the recipient pad, and the most recent inter-hub pad is subsequently removed.

In some embodiments, a centralized OTP encryption scheme comprising N end users may comprise a plurality of OTP hubs, each provided with a specified set of end user pads associated with between 1 and N users. A multi-hub network may offer multiple routing paths between each pair of users, and as such provides redundancy in case of, e.g., hub failure, and/or selection of best route to, e.g., optimize hub pad usage. In some embodiments, one or more routing algorithms may be implemented to select appropriate and/or optimized routes.

Figure 2A:
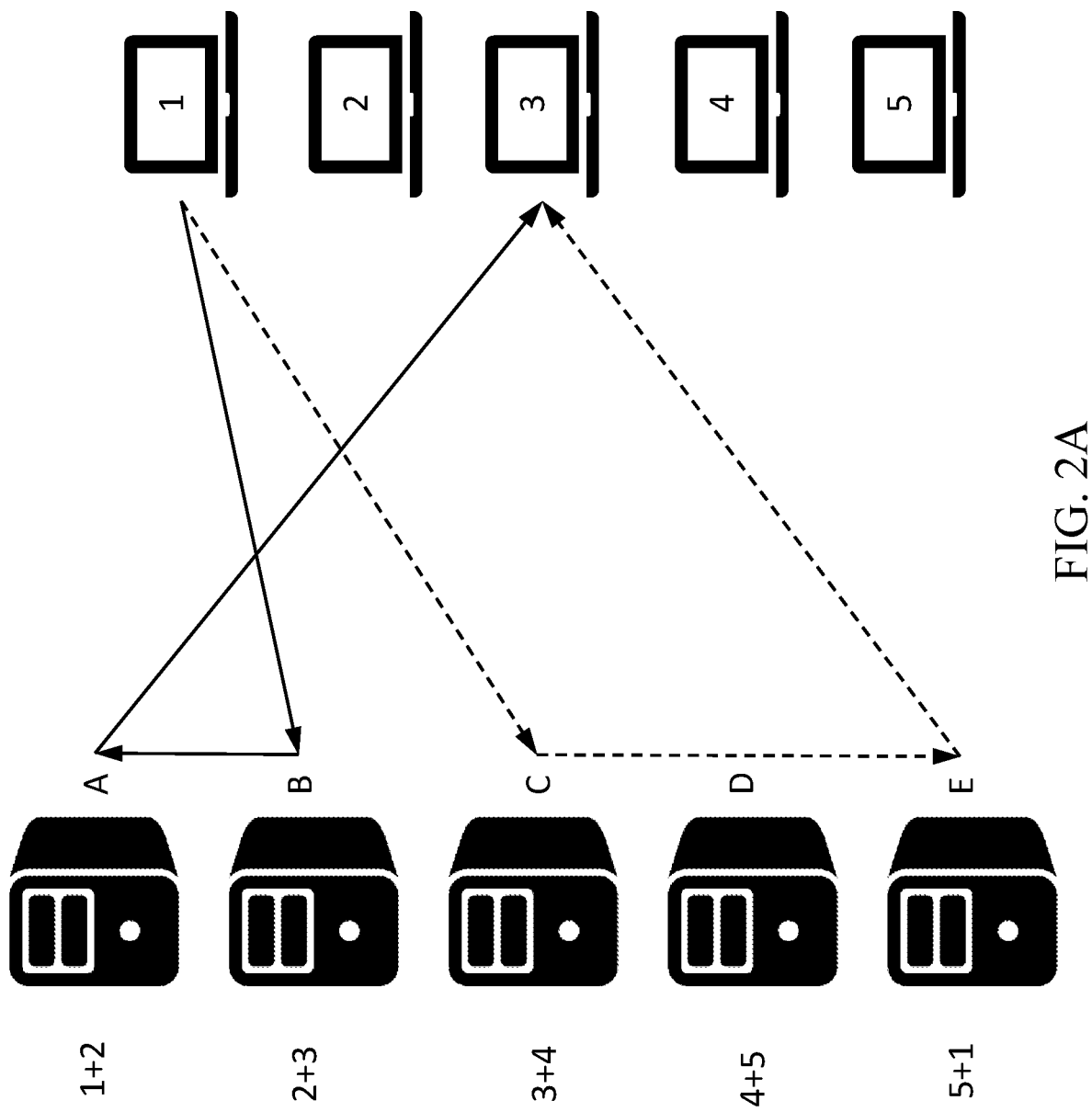
FIGS. 2A-2B illustrate a network with multiple end users and OTP hubs, according to an embodiment.

FIG. 2A illustrates a network with 5 end users 1-5 and 5 hubs A-E. Each hub is provided with 2 pads, which may be distributed according to several schemes, e.g., in a circular shift arrangement. For example, hub A may have pads for users 1 and 2, hub B for users 2 and 3, etc. Accordingly, when sending a message from user 1 to user 3, for example, user 1 may send the message using several possible routes, e.g.:

User 1 may send the message to hub B, which will apply the user 3 pad, then transmit the message to hub A which will remove the user 1 pad and transmit the message to user 3.
(ii) User 1 may send the message to hub C, which will apply the user 3 pad, then transmit the message to hub E which will remove the user 1 pad and transmit the message to user 3.

In some embodiments, two or more hubs holding pads for the same user may be provided with different versions of the user's pad, so as to avoid having different hubs retaining the same pads.

Figure 2B:
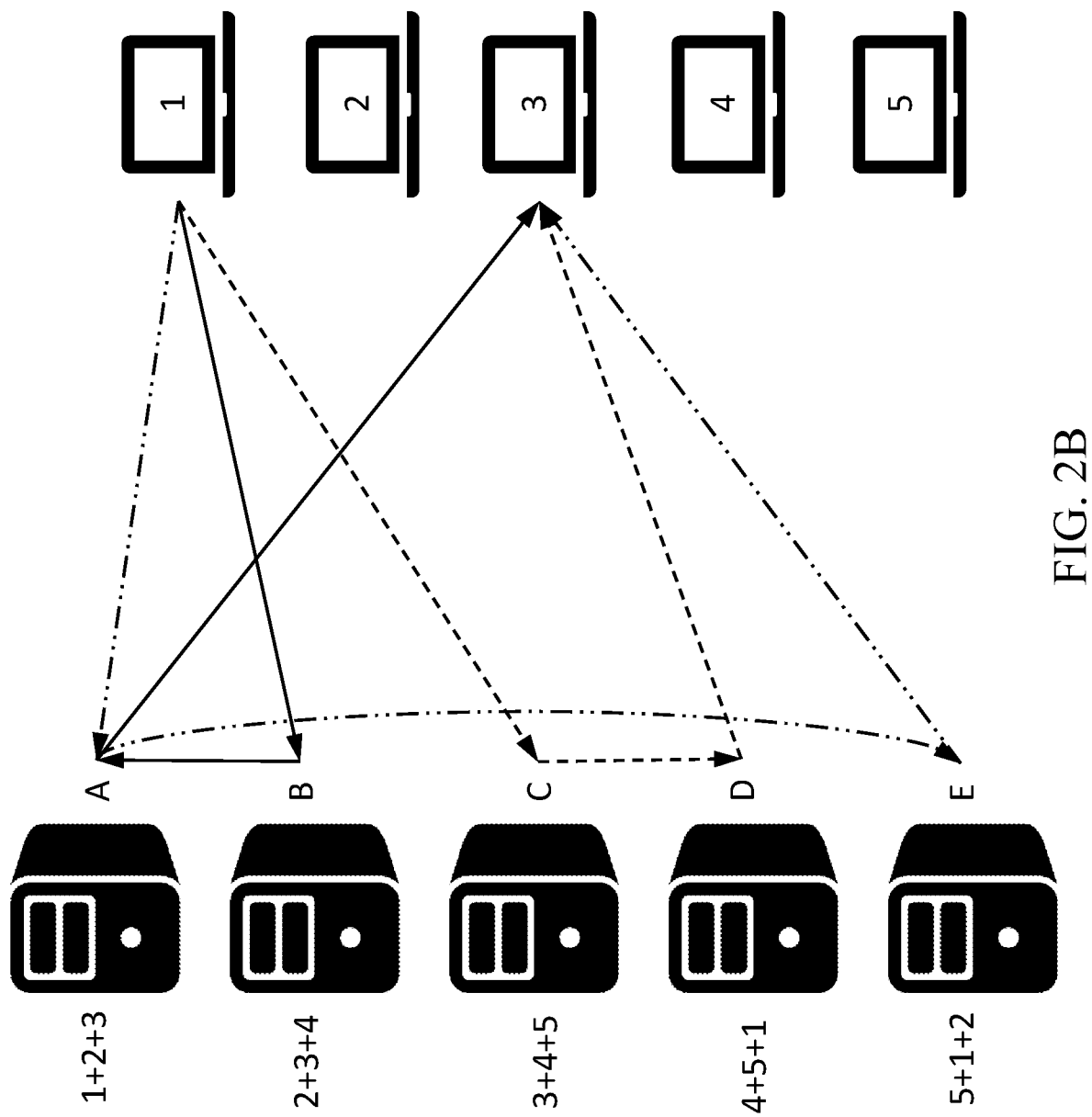

FIG. 2B illustrates a network with 5 end users 1-5 and 5 hubs A-E, similar to the one depicted in FIG. 2A. However, in this arrangement, each hub is provided with 3 pads. Accordingly, when sending a message from user 1 to user 3, user 1 may send the message using more possible routes, e.g.:

(i) User 1 may send the message to hub B, which will apply the user 3 pad, then transmit the message to hub A which will remove the user 1 pad and transmit the message to user 3.
(ii) User 1 may send the message to hub C, which will apply the user 3 pad, then transmit the message to hub D which will remove the user 1 pad and transmit the message to user 3.
(iii) User 1 may send the message to hub A, which will apply the user 3 pad, then transmit the message to hub E which will remove the user 1 pad and transmit the message to user 3.

In some embodiments, by increasing the number of hubs in the network and/or the number of pads per hub, there is created greater redundancy of routing options within the network.

Figure 3:
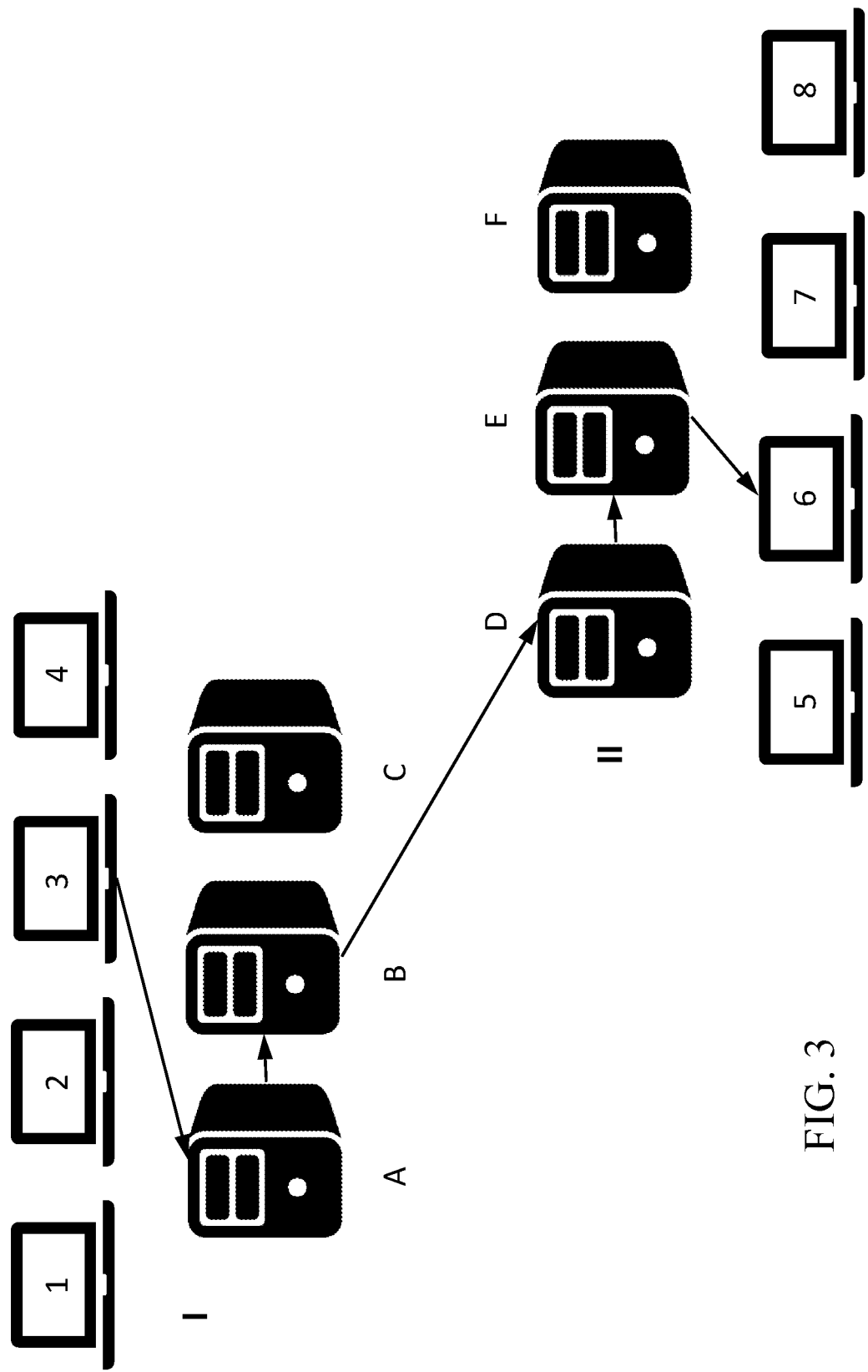
FIG. 3 illustrates messaging between network clusters, according to an embodiment.

In some embodiments, two or more secure networks of the present invention may provide for inter-network communications by providing each hub in each network with a shared pad. In some embodiments, each hub in a network may retain a different shared pad, so as to avoid duplication of shared pads across multiple hubs. The shared pad can be stored in separate dedicated hub or hubs (e.g., for redundancy purposes) for inter network connectivity, or can be stored by the regular hubs. Accordingly, a message from a first network may securely hop into a second network, as illustrated in FIG. 3. Thus, for example, a message may be routed from user 3 in network I to user 6 in network II. The message may be sent first to hub A where an inter-network pad may be applied to the message. The message may then be sent to, e.g., hub B, for removing the user 3 pad. From hub B, the message may hop to hub D in network II, where a user 6 pad may be applied, and from there, to hub E, where the inter-network pad may be removed. The message may then be transmitted to user 6.

Message Routing Optimization

In some embodiments, as noted above, the present invention provides for a communications network layout with a plurality of optional message routes through one or more hubs within a network, and/or through one or more remote networks, from sender to recipient. In some embodiments, this may offer redundancy in case of, e.g., hub failure.

In some embodiments, the present invention may be further configured for optimizing message routing according to specified criteria, including, but not limited to, based on an OTP usage metric. In some embodiments, additional and/or other optimization criteria may be used, including network bandwidth, network storage capacity, network delay, OTP hub hop count, path real usage cost, load, MTU (maximum transmission unit), reliability, and/or communication cost.

Because OTPs are a depleting resource, every transmission between hubs (FIGS. 2A-2B), and/or between network clusters (FIG. 3), involves the use and depletion of at least portions of one or more OTPs. Accordingly, in some embodiments, optimized route selection is configured for minimizing OTP usage along the route, e.g., through minimizing the number of hops among hubs and/or network clusters. In some embodiments, the present invention may be configured for calculating a route from sender to recipient having the smallest total OTP usage metric.

By way of background, in the context of a computer networks, message routing is the process of selecting a path for traffic within the network, or across multiple networks. In packet switching networks, routing usually involves forwarding packets on the basis of routing tables, which maintain a record of the routes to various network destinations. A routing table, or routing information base (RIB), is a data table stored in a network node, such as a router, a networked computer, or a server, and lists the routes to particular network destinations and associated metric, such as distances, cost of operation, or delays. The routing table contains information about the topology of the network immediately around it, constructed using routing protocols based on, e.g., manual entries during network initialization. For example, a routing table may contain network/next hop associations which tell a router that a particular network destination can be optimally reached by sending the packet to a specific router that represents the 'next hop' on the way to the final destination. In some cases, one or more remote networks may be added to a routing table during initialization or through dynamic routing protocols.

However, because in the present case a routing optimization metric involves a dynamic depleting resource, routing optimization cannot be determined based on static routing tables. Accordingly, in some embodiments, a centralized encryption scheme of the present invention may be configured for producing a routing table, wherein each network node, such as an OTP hub and/or end user, may be configured for gathering information about all the other network nodes to which it can connect. In some embodiments, each network node may then independently assemble this information into a routing table and/or network map. In some embodiments, based on these individual routing tables, each network node may independently determine a least-cost path from itself to every other node, using one or more known shortest paths algorithms, such as a distance vector algorithm (e.g., Bellman-Ford algorithm, Dijkstra's algorithm, Viterbi algorithm), a list short paths algorithm, a path vector protocol, and the like. The result may be a tree graph rooted at the current node, such that the path through the tree from the root to any other node is the least-cost path to that node. This tree then serves to construct the routing table, which specifies the best next hop to get from the current node to any other node.

In some embodiments, a communication network off the present invention may provide or a centralized message routing control, which may be used to manage the routing in the network or any part of it. In such a case, the OTP usage metric determined by one or more network nodes may be communicated to the control function, which may then determine routing paths.

In some embodiments, an optimized route may be determined based solely on a pad usage matric, and/or represent a combination of multiple parameters, including, but not limited to bandwidth, network delay, hop count, path real usage cost, load, MTU (maximum transmission unit), reliability, and/or communication cost.

Message Authentication

In some embodiments, the present invention provides for positive identification and authentication of end users in a network.

As noted above, in an OTP-based encryption scheme, user authentication is of the essence, because an end user's pad may be misappropriated and/or reproduced by a bad actor and then used to impersonate an actual user of the network.

The one-time pads themselves provide no message authentication, and this lack of an authentication can pose a security threat in real-world applications. The straightforward XORing with the keystream creates a potential vulnerability in message integrity, which is especially simple to exploit. For example, an attacker who knows that a message contains the string, "meet Jane and me tomorrow at 3:30 pm" at a particular point, can replace that content by any other content of the exact same length, such as "3:30 meeting is cancelled, stay home," without having access to the one-time pad.

Accordingly, in some embodiments, the present invention provides for a user authentication pad that is stored by the user and may be used for authenticating and verifying the user, e.g., in case that an original user pad has been misappropriated.

For example, when a user joins a network of the present invention, the user may be assigned a primary authentication one-time pad (PAOTP), which may be provided, e.g., on a physical portable memory device, such as a memory card or disk-on-key. A copy of the PAOTP may also be saved to one or more centralized OTP hubs of the network, and/or may be split among two or more OTP hubs, so that each split is different from other parts. When communicating within the network for the first time, e.g., a portion of the PAOTP may be used for initial identification and authentication. Upon initial authentication, the used portion of the PAOTP may then be discarded. The user may then receive a runtime pad for using in regular ongoing communications through the network. The PAOTP may then be saved by the user in a safe place in case it may be needed again in the future for a two-step authentication of the user.

During ongoing runtime network communications, the user may be identified by using portions of the runtime pad. However, in some cases, there is needed a stronger two-step verification process. For example, a user may wish to revoke the runtime user pad, or the user may be required by the network to update/replace its runtime pad, e.g., in case of suspicious activity. In such cases, the POTP may be used to authenticate the end user.

In some embodiments, universal hashing may also be used as an additional authentication mechanism. The universal hashing mechanism provides a way to authenticate messages up to an arbitrary security bound (i.e., for any p>0, a large enough hash ensures that even a computationally unbounded attacker's likelihood of successful forgery is less than p). However, universal hashing coms at a cost of using additional random data from encryption pads.

Random Numbers Generating

In some embodiments, OTPs for use in connection with the present invention may be generated in a plurality of locations, including, but not limited to, within the OTP hubs, or in a centralized location.

In some embodiments, one or more of the OTP hubs may comprise a device and/or function responsible for generating large amounts of true random data. In some embodiments, random data generation may be based in one or more a physical processes, e.g., based on microscopic phenomena such as thermal noise, the photoelectric effect, other quantum phenomena, chaos mechanics, and/or or any other similar processes. In some embodiments, the present invention may provide for testing the random data generated as described below, e.g., through entropy and similar tests.

Automatic Teller Machines for OTP Delivery

In some embodiments, the present invention may utilize a physical distribution network, such as an automatic teller machine (ATM) and/or similar safe-box mechanism for delivery and distribution of OTPs to end users. For example, such an ATM may dispense an external memory device, such as a disk-on-key, containing the OTP. In some embodiments, an ATM of the present invention may have a hard drive containing the OTPs, dispense to an external memory device, such as a portable memory device (e.g., a flash drive) provided by a user. In some embodiments, an ATM of the present invention may be configured for generating OTPs locally using suitable random data generation hardware, and/or be provided with OTPs generated externally, e.g., through the OTP hubs. The ATM may also be responsible for updating the system's OTP hubs about OTPs distributed to end users.

In some embodiments, one or more of the OTP hubs of the present invention may comprise an ATM, in addition to OTP generating capabilities. Each such OTP hubs may form a standalone physically-secured device which generates and distributes OTPs to end users, and then handles encrypted traffic of the resulting network. Thus, there is enabled the establishing of a centralized OTP encryption scheme from any desired location using one of more such devices.

In some embodiments, standalone ATMs of the present invention may be located in various desired locations, to dispense OTPs as necessary to end users. OTPs may then be generated locally within the ATM, and/or remotely, and securely delivered to the ATMs for further distribution to end users in that location. Secure delivery of OTPs to ATMs may be carried out through Quantum Key distribution (QKD) communication and/or, e.g., physically secured means, such as secure vehicles and/or containers. End users may then access the ATMs to acquire OTPs by, e.g., loading a memory device. Once dispensed to a user, an OTP may be denoted by the system as associated with that user, and used for routing messages to that user.

In some embodiments, OTPs may be delivered directly to OTP hubs and/or end users through QKD and/or physically secured means, such as secure vehicles and/or containers.

QKD is the process of using quantum communication to establish a shared key between two parties without a third-party learning anything about that key, even if the third party can eavesdrop on all communication between the parties. The QKD key may thus be used for delivering OTPs to specific defined destinations of the present system.

OTP Disposal

As noted above, used OTPs must be deleted and disposed to prevent any misappropriation. In some embodiments, OTPs of the present invention may be disposed by overwriting all or portions of an OTP with false data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a one-time pad (OTP) hub, from a first user of a computer network, a communication encrypted with an OTP associated with said first user, wherein said communication is intended for a second user;
   encrypting, by said hub, said communication with an OTP associated with said second user;
   decrypting, by said hub, said communication with an OTP associated with said first user; and
   delivering said communication to said second user,
   wherein said hub is a first hub in a series of OTP hubs;
   wherein said encrypting, by said first hub, comprises encrypting said communication with a first inter-hub OTP;
   wherein said decrypting, by said first hub, comprises decrypting said communication with an OTP associated with said first user;
   and wherein said delivering comprises:
   forwarding said communication through one or more of said OTP hubs in said series, wherein each said forwarding between a current pair of said OTP hubs comprises:
   (i) encrypting said communication with an inter-hub OTP associated with said current pair, and
   (ii) decrypting said communication with an inter-hub OTP associated with a previous said pair;
   encrypting, by a last OTP hub of said series of hubs, said communication with an OTP associated with said second user;
   decrypting, by said last OTP hub of said series of hubs, said communication with said inter-hub OTP associated with said previous pair; and
   transmitting said communication to said second user.

2. The method of claim 1, wherein said second user further decrypts said communication with an OTP associated with said second user.

3. The method of claim 1, herein said network comprises a plurality of users, wherein each of said users stores only an OTP associated with said user, and wherein said hub stores OTPs associated with each of said plurality of users.

4. The method of claim 1, wherein said second user further decrypts said communication with an OTP associated with said second user.

5. The method of claim 1, wherein said network comprises N said users and a plurality of said hubs, wherein each of said users stores only an OTP associated with said user, and wherein each of said hubs stores OTPs associated with between 1 and all of said users.

6. The method of claim 5, wherein at least some of said users and said hubs store a routing table identifying said associations between said OTPs stored by each of said hubs and their associated users, and wherein at least some of said receiving, said forwarding, and said transmitting are based, at least in part, on said routing table.

7. The method of claim 6, wherein said routing table takes into account an OTP usage metric.

8. The method of claim 1, wherein said delivering comprises transmitting, by said hub, said communication to a second OTP hub;
   decrypting, by said second OTP hub, said communication with an OTP associated with said first user; and
   transmitting said communication to said second user.

9. The method of claim 8, wherein said second user further decrypts said communication with an OTP associated with said second user.

10. The method of claim 8, wherein said network comprises N said users and a plurality of said hubs, and wherein each of said hubs stores OTPs associated with between 1 and all of said users.

11. The method of claim 8, wherein each of said hubs stores OTPs associated with between 1 and all of said users.

12. The method of claim 10, wherein at least some of said users and said hubs store a routing table identifying said associations between said OTPs stored by each of said hubs and their associated said users, and wherein at least some of said receiving and said transmitting are based, at least in part, on said routing table.

13. The method of claim 1, wherein each of said users stores a second OTP associated with said user, and wherein said second OTP is configured for use in connection with a two-step user authentication of said user.

14. The method of claim 13, wherein said second OTP is configured for use in connection with a two-step user authentication of said user.

15. The method of claim 1, wherein at least some of said OTPs are disposed of by overwriting at least a portion thereof using false data.

16. The method of claim 1, wherein at least some of said OTP hubs further comprise at least one of a random numbers generator (RNG), and an automated teller machine configured for dispensing OTPs to said users.

17. The method of claim 16, wherein said OTPs are distributed to the automated teller machine using at least one of Quantum Key distribution (QKD) communication, and physically secured distribution means.

* * * * *